C. C. Garrett.
Cotton Planter.

No. 23,164.          Patented Mar. 8, 1859.

B. R. Eppes
J. W. Baird

Inventor:
Chas. C. Garrett

UNITED STATES PATENT OFFICE.

CHAS. C. GARRETT, OF SPRING HILL, ALABAMA.

IMPROVEMENT IN COTTON-SEED PLANTERS.

Specification forming part of Letters Patent No. 23,164, dated March 8, 1859.

*To all whom it may concern:*

Be it known that I, CHARLES C. GARRETT, of Spring Hill, in the county of Marengo and State of Alabama, have invented a new and Improved Cotton-Seed Planter; and I do hereby declare that the following is a full, clear, and exact description of the same, reference being had to the annexed drawings, making a part of this specification, in which—

Figure 2:
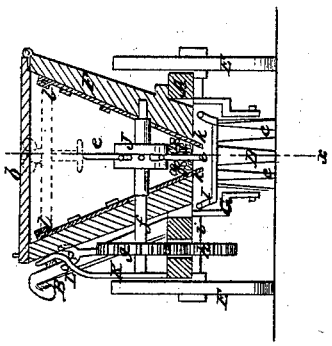
Figure 1:
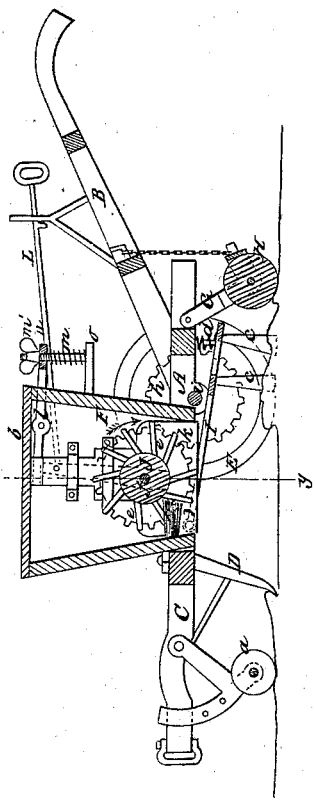

Figure 1 is a longitudinal vertical section of my invention, taken in the line $x\ x$, Fig. 2. Fig. 2 is a transverse vertical section of the same, taken in the line $y\ y$, Fig. 1.

Similar letters of reference indicate corresponding parts in the two figures.

This invention consists in the employment or use of a rotating toothed wheel in connection with stationary stripping-brushes, the wheel and brushes being placed in the bottom of a seed-box, which is provided with adjustable plates, the parts being arranged to operate as hereinafter fully shown and described, whereby the cotton-seed may be planted in the same state as they are discharged from the gin and the discharge of seed regulated, as may be desired.

To enable those skilled in the art to fully understand and construct my invention, I will proceed to describe it.

A represents a rectangular frame, to the back part of which two handles, B B', are attached, and to the front of which a projecting bar, C, is secured, said bar having two small gage-wheels, $a$, affixed to it. Through the back part of the bar C, at its junction with the frame A, the shank of a furrow-share, D, passes. The frame A is mounted on two wheels, E E, and a seed-box, F, is placed on said frame, the box being provided with a cover, $b$. To the back end of the frame A a drop-frame, G, is attached, said frame having a roller, H, fitted within it, and to the under side of the frame A a frame, I, is attached at its front end, said frame having harrow-teeth $c$ attached to its back part and acted upon at its back end by a spring, $d$, said spring having a tendency to keep the teeth into the ground. This will be clearly understood by referring to Fig. 1.

J is a wheel, which is placed in the lower part of the seed-box F, and has teeth or rods $e$ projecting from it in a somewhat tangential position, as shown clearly in Fig. 1. The axis $f$ of this wheel extends through one side of the seed-box, and it has a pinion, $g$, placed on it, said pinion gearing into a corresponding pinion, $h$, on the axle $i$ of the wheels E E. The end of the axis $f$ of the wheel J adjoining the pinion $g'$, is fitted in a lever, K, the lower end of which is attached or pivoted to the frame A, and has a rod, L, attached to it. By this arrangement the pinion $g$ may be thrown out of gear with the pinion $h$, when desired.

At the bottom of the seed-box F, and to each side of its front part, a stationary horizontal brush, $j$, is attached, between which the teeth or rods $e$ of the wheel J pass as said wheel rotates, and to each side of the seed-box F an adjustable or sliding plate, $k$, is fitted, said plates extending a trifle below the bottom of the seed-box, and adjusted higher or lower, as may be desired, by means of arms $l\ l$ and a screw and nut, $m\ m'$, the former passing through the center of a cross-bar, $n$, which connects the outer ends of the arms $l\ l$, the lower end of the screw being attached to a projection, $o$, attached to the back part of the seed-box, as shown clearly in Fig. 1.

By referring to Fig. 2 it will be seen that the sides of the hopper are placed in inclined positions, and that by adjusting the plates $k\ k$ higher or lower the discharge-orifice of the seed-box may be enlarged or constructed as occasion may require.

The operation is as follows: The cotton-seed to be planted is placed in the seed-box F, and as the machine is drawn along the wheel J is rotated by the gearing $g\ h$ in the direction indicated by the arrow, and the teeth or rods $e$ will draw the seed, which are covered with lint precisely the same as they came from the gin, from the box, the discharge of the seed being regulated by adjusting the plates $k\ k$ so as to enlarge or contract the space between them. As the teeth or rods $e$ pass upward between the brushes $j\ j$ the latter strip the seed from them, as the lint causes the seed to adhere to the teeth or rods. The tangential position of the rods or teeth $e$ favors the action of the brushes $j\ j$ or the stripping of the seed from the teeth or rods. This will be clearly understood by referring Fig. 1.

The share D, wheels $a$, harrow-teeth $c$, and roller H perform their usual offices—to wit, the wheels $a$ regulating the depth of the furrow, the share D opening the furrow, the teeth $c$ covering the seed, and the roller H pressing the earth on the same.

The difficulty attending the planting of cotton-seed by a machine has been owing to the lint which is attached to the seed, and which the gin does not remove. The lint causes the seed to adhere together and prevents a free discharge of the same. By my invention this difficulty is obviated.

I am aware that rotating agitators and stirrers have been used and arranged in various seeding-machines to insure the free discharge of seed from the same, and I therefore do not claim separately the rotating toothed wheel J; but,

Having thus described my invention, what I do claim as new, and desire to secure by Letters Patent, is—

In combination with the wheel J and brushes $j\ j$, the adjustable plates $k\ k$, arranged substantially as and for the purpose specified.

CHAS. C. GARRETT.

Witnesses:
B. R. EPPES,
J. W. BAIRD.